(12) United States Patent
Lien et al.

(10) Patent No.: US 8,055,384 B2
(45) Date of Patent: Nov. 8, 2011

(54) APPARATUS AND METHOD FOR POSITIONING CONTROL

(75) Inventors: Chih-Ru Lien, Baihe Township, Tainan County (TW); Li-Te Kuo, Jhudong Township, Hsinchu County (TW)

(73) Assignee: Wah Hong Industrial Corp., Kaohsiung (TW)

(*) Notice: Subject to any disclaimer, the term of this patent is extended or adjusted under 35 U.S.C. 154(b) by 720 days.

(21) Appl. No.: 12/214,196

(22) Filed: Jun. 17, 2008

(65) Prior Publication Data

US 2009/0030546 A1 Jan. 29, 2009

(30) Foreign Application Priority Data

Jul. 24, 2007 (TW) .................. 96126912 A

(51) Int. Cl.
*G05B 19/04* (2006.01)
*G05B 9/18* (2006.01)

(52) U.S. Cl. ........ 700/255; 700/245; 700/258; 700/256

(58) Field of Classification Search ........................ None
See application file for complete search history.

(56) References Cited

U.S. PATENT DOCUMENTS

| | | | | |
|---|---|---|---|---|
| 4,488,098 A | * | 12/1984 | Shimonou | 318/561 |
| 4,727,303 A | * | 2/1988 | Morse et al. | 318/616 |
| 4,808,063 A | * | 2/1989 | Haley | 414/730 |
| 4,851,748 A | * | 7/1989 | Daggett et al. | 318/568.2 |
| 4,860,215 A | * | 8/1989 | Seraji | 700/260 |
| 5,059,880 A | * | 10/1991 | Hiroi | 318/610 |
| 5,710,496 A | * | 1/1998 | Boom | 318/610 |
| 5,848,535 A | * | 12/1998 | Sibik | 62/99 |
| 5,936,372 A | * | 8/1999 | Nashiki et al. | 318/701 |
| 6,424,873 B1 | * | 7/2002 | Przybylski | 700/42 |
| 6,445,979 B1 | * | 9/2002 | Inoue et al. | 700/258 |
| 2004/0172201 A1 | * | 9/2004 | Matsuda et al. | 702/19 |

* cited by examiner

*Primary Examiner* — Khoi Tran
*Assistant Examiner* — Bhavesh V Amin
(74) *Attorney, Agent, or Firm* — C. G. Mersereau; Nikolai & Mersereau, P.A.

(57) ABSTRACT

The present invention discloses a positioning control apparatus which receives a moving command and a feedback signal outputted from a controlled device, and controls the controlled device for moving and positioning. The positioning control apparatus includes a first control loop, a second control loop and an arbitration module with a dead point default value, wherein the first control loop is used to control the controlled device moving in response to the error of the moving command and the feedback signal, on the other hand, the second control loop is used to control the controlled device positioning. Furthermore, the arbitration module compares the default value of dead point with the moving command so as to enable either the first control loop or the second control loop.

22 Claims, 6 Drawing Sheets

APPARATUS AND METHOD FOR POSITIONING CONTROL

BACKGROUND OF THE INVENTION

1. Field of the Invention

The present invention generally relates to an apparatus and method for positioning control; in particular, to an apparatus and method for positioning control which is used to control the moving and positioning of a controlled device in accordance with the comparison of a moving command and a dead point default value.

2. Description of Related Art

Referring to FIG. 1, a block diagram of a prior art control system is shown. In such a conventional control system, there comprise a man-machine interaction or a commander 10 (MMI-C 10), a control driving circuit 12 and a controlled device 14. The control driving circuit 12 receives the command SD sent from the MMI-C 10 and further outputs a control signal SC to the controlled device 14 according to the command SD. The controlled device 14 is controlled by the control signal SC and acts accordingly, and sends a feedback signal SF back to the control driving circuit 12, in order to provide control for the driving circuit 12 to perform closed-loop control. In addition, the control driving circuit 12 may also send the control status back to the MMI-C 10, so as to allow the user to check the status of the control system.

In conjunction with FIG. 1, now refer to FIG. 2, in which a diagram of prior art slider moving control is shown. The moving control of the slider 20 uses the above-mentioned prior art control system. The MMI-C 10 issues a forward command SD to the control driving circuit 12, enabling the control driving circuit 12 to drive the controlled device 14 installed in the slider 20 for driving the slider 20 to move forward. At the same time, the controlled device 14 sends a feedback signal SF to the control driving circuit 12. In this way, the control driving circuit 12 may controls the forward moving of the slider 20 via the classic closed-loop controller method.

As the slider 20 moves to a dead point, the top pin 202 on the slider 20 will trigger a feedback device 24. It should be noted, the term dead points from structure engineering are notches used to lock the position, when used in terms of mechanical control system, it serves similar meaning, and refers to a defined geometric point. At this time, the feedback device 24 sends a dead point feedback signal ST to the control driving circuit 12, so as to inform the control driving circuit 12 to perform braking action or reset, which would prevent the slider 20 from impacting the critical plane 22 and allowing for the general positioning of the slider 20. The approach of control may compensate for the positioning of the slider 20 from the influences caused by factors such as wearing, dusts, airflow, vibrations, thus allowing normal operation.

However, as the machining technologies advance, more and more designs of part/component or combination thereof needs to meet the requirements of high precision, low error and small size; meanwhile, the moving and positioning of the aforementioned slider 20 are required to satisfy the said requirements as well.

Hence, when the moving condition of the controlled device 14 being driven enters into the micro cosmic or near-field scope, the volume of the feedback device 24 is often too big, thus implementation becomes impossible. Besides, the feedback device 24 may generate error in responsiveness due to factors of wearing, dusts or machining and so on, resulting in the existence of a spacing gap between the braking position of the slider 20 and the critical plane 22, wherein the gap would not effectively approach zero.

Meanwhile, if the feedback device 24 is removed, the spacing gap between the braking position of the slider 20 and the critical plane 22 may still be impossible to approach zero due to the factor of variation in the surface of the critical plane 22; more seriously, after the integration on the spacing gap by the integration processor (not shown) in the control driving circuit 12, it will generate huge driving force to drive forward the slider 20, causing the controlled device 14 to be subject to tremendous invalid power, and thus can even be damaged.

SUMMARY OF THE INVENTION

In view of the issues described supra, the present invention provides an apparatus and method for positioning control, wherein the present invention controls the moving and positioning of the controlled device based on the comparison of a moving command and a dead point default value. Such an apparatus for positioning control needs not to employ prior art feedback device, still being able to offer precise positioning of the controlled device, preventing the positioning of the controlled device from entering into the dead point area which may cause serious damage thereto.

For the said purpose, the apparatus for positioning control according to the present invention comprises an arbitration module, a first driving module, a second driving module, a switching module and an error correction module. Herein, the arbitration module has a dead point default value, and receives a moving command. The arbitration module compares the moving command (temporary designated as compare 1a, in order to easier relate Apparatus to Method, wherein the method description is 2 paragraphs down) with the dead point default value (compare 1b) to output a control signal; and then, the moving command is converted into a moving signal output. The first driving module is connected to the arbitration module and the controlled device, which receives the said moving signal (compare 2a) and a moving feedback signal (compare 2b) sent from the controlled device, so as to output a first driving signal. The second driving module is used to output a second driving signal.

The switching module is connected to the arbitration module, the first driving module, the second driving module and the controlled device, in which the switching module is controlled by the control signal so as to send the first driving signal or the second driving signal to the controlled device. The error correction module is connected to the arbitration module and first driving module, which is controlled by the arbitration module to correct the accumulated error in the first driving module.

Furthermore, the method for positioning control according to the present invention is applicable to an apparatus for positioning control, that is used for controlling the moving and positioning of a controlled device, comprising the following steps: first, acquiring a moving command, and determining whether the moving command can be interpreted. If it is interpretable, then next, determining whether the moving command has been processed. If not yet being processed, then it is determined as a new moving command, and comparing this new moving command (compare 1a) with a dead point default value (compare 1b), so as to determine whether the new moving command and dead point default value match. If they do, then controlling the controlled device to stop moving to enter into a positioning status. If they do not match, then converting the new moving command into a new moving signal output, and also controlling the controlled device to start to move in positions in response to the comparison of the moving feedback signal (compare 2a) sent from the controlled device and the said moving signal (compare 2b).

According to the above-mentioned description, the apparatus for position control of the present invention needs not to use feedback device (i.e. feed back device 24 from FIG. 2), while still allowing precise positioning of the controlled device, which is suitable for micro cosmic or near field scope, providing the advantage applicability for miniature device. Additionally, the method for positioning control of the present invention controls the course of moving or positioning of the controlled device in accordance with the comparison of the moving command and the dead point default value, and achieves the positioning control with high precision and low error by means of the course of positioning.

In order to allow the viewers of the patent application to further appreciate the aspects and technical contents of the present invention, reference can be made to the subsequent detailed description and append drawings of the present invention found in the present specification; however, the appended drawings are merely for the purpose of illustration, without any intention to restrict the present invention thereto.

DETAILED DESCRIPTION OF THE PREFERRED EMBODIMENTS

Figure 3:
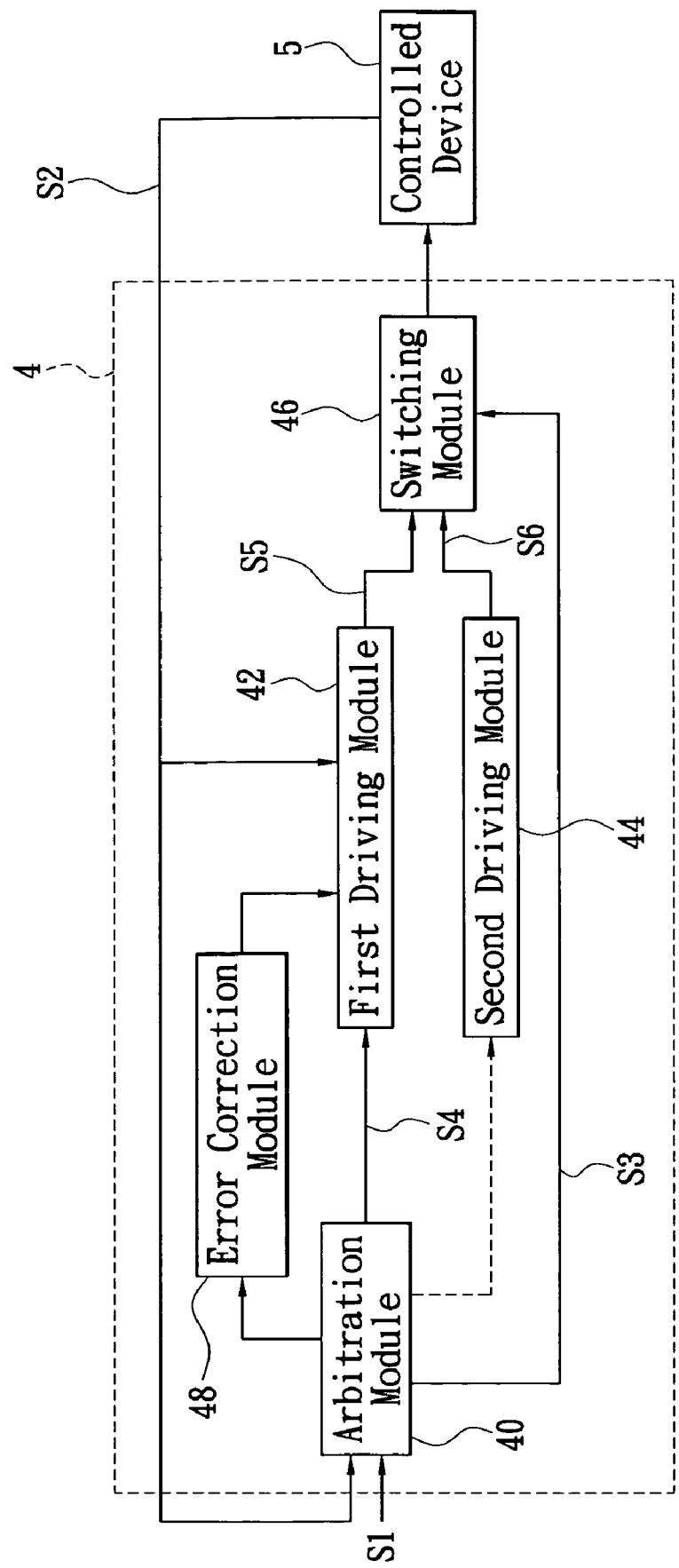
FIG. 3 shows a functional block diagram of the apparatus for positioning control according to the present invention.

Refer now to FIG. 3, wherein a functional block diagram of the apparatus for positioning control according to the present invention is shown. The positioning control apparatus 4 is connected to a controlled device 5, which acts as the control for the moving and positioning of the controlled device 5, in which the positioning control apparatus 4 receives a moving command S1 from a man-machine interaction or commander (MMI-C not shown in FIG. 3) as well as a moving feedback signal S2 from the controlled device 5, and controls the moving and positioning of the controlled device 5 according to the comparison of the moving command S1 and the moving feedback signal S2.

Referring again to FIG. 3, the positioning control apparatus 4 comprises an arbitration module 40, a first driving module 42, a second driving module 44, a switching module 46 and an error correction module 48. Herein the arbitration module 40 has a dead point default value (not shown), and acquires the moving command S1 from the man-machine interaction or commander (MMI-C), and also receives the moving feedback signal S2 from the controlled device 5, then compares the moving command S1 and the moving feedback signal S2 with the internal dead point default value, then outputs a control signal S3 in response to the comparison. Additionally, the arbitration module 40 also converts the moving command S1 into a moving signal S4 output.

Referring yet again to FIG. 3, the first driving module 42 is connected to the arbitration module 40 and the controlled device 5, which receives the moving signal S4 and the moving feedback signal S2. The first driving module 42 is used to calculate the difference between the moving signal S4 and the moving feedback signal S2, and further outputs a first driving signal S5. The error correction module 48 is connected to the arbitration module 40 and the first driving module 42, which is controlled by the arbitration module 40 to correct the accumulated error between the moving signal S4 and the moving feedback signal S2 in the first driving module 42.

Referring still to FIG. 3, the second driving module 44 is used to output a second driving signal S6. Furthermore, the switching module 46 is connected to the arbitration module 40, the first driving module 42, the second driving module 44 and the controlled device 5, which is controlled by the control signal S3 from the arbitration module 40. The switching module 46 performs switching action based on the control signal S3, so as to send the first driving signal S5 or the second driving signal S6 to the controlled device 5.

Referring still once again to FIG. 3, the first driving module 42 and the switching module 46 together form a first control loop, wherein the first control loop uses the moving signal S4 converted from the moving command S1 and the moving feedback signal S2 as the control for the moving of the controlled device 5. Whereas, the second driving module 44 and the switching module 46 together form a second control loop, wherein the second control loop controls the positioning drive of the controlled device 5. The arbitration module 40 compares the moving command S1 and the moving feedback signal S2 with the dead point default value, and accordingly controls either the first control loop or the second control loop based on the comparison.

In the description supra, when the comparison made by the arbitration module 40 turns out that the moving command S1 and the moving feedback signal S2 do not match the dead point default value, the control signal S3 outputted by the arbitration module 40 controls the switching module 46 to switch the first control signal S5 to the controlled device 5, so as to provide the moving drive for the controlled device 5. Contrarily, when the comparison made by the arbitration module 40 turns out that the moving command S1 and the moving feedback signal S2 match the dead point default value, the control signal S3 outputted by the arbitration module 40 controls the switching module 46 to switch the second control signal S6 to the controlled device 5, so as to provide the positioning drive for the controlled device 5.

Figure 4:
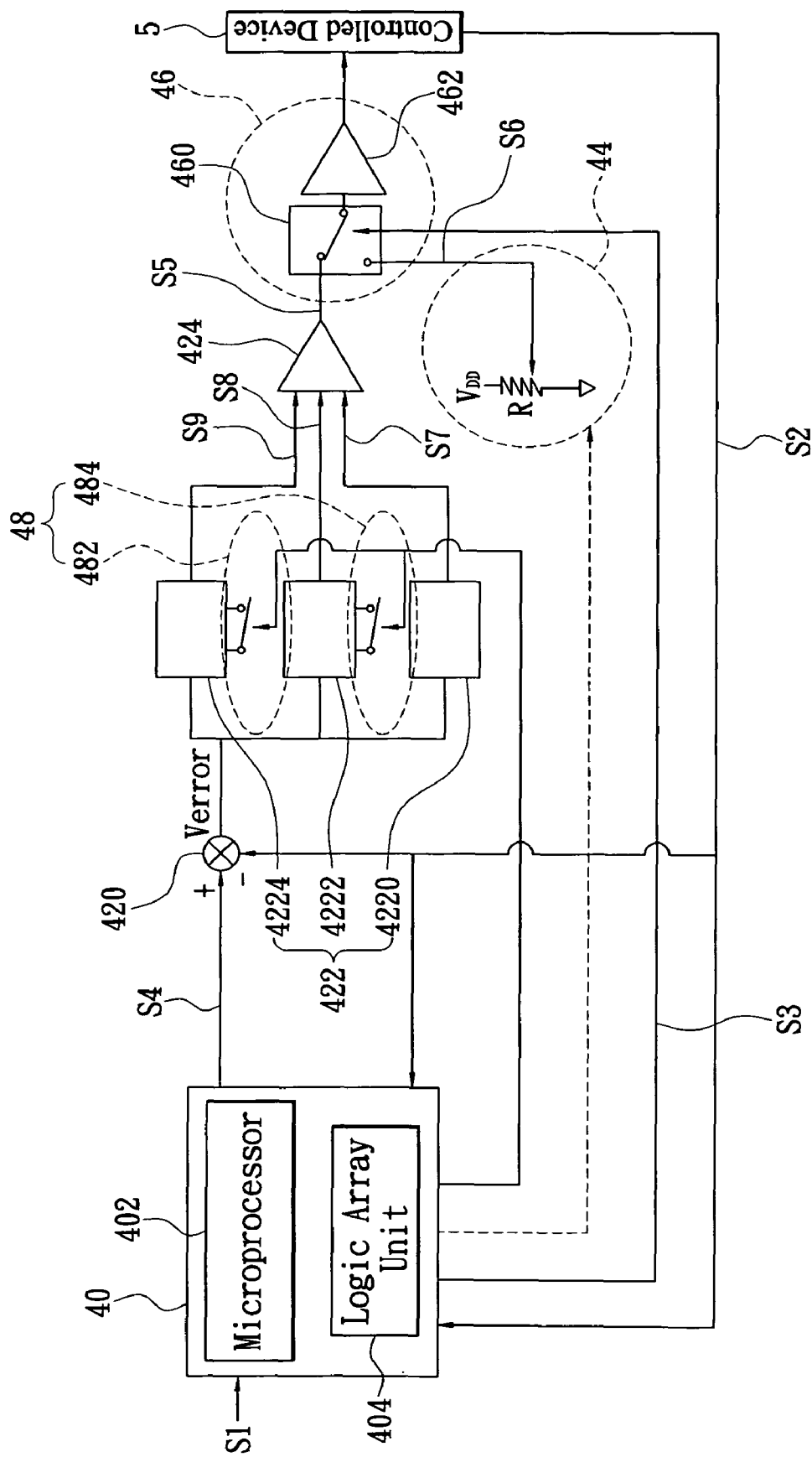
FIG. 4 shows a circuit diagram of the apparatus for positioning control according to the present invention.

In conjunction with FIG. 3, refer now to FIG. 4, wherein a circuit diagram of the apparatus for positioning control according to the present invention is shown. The arbitration module 40 therein comprises a microprocessor 402 and a logic array unit 404, in which the microprocessor 402 compares the moving command S1 and the moving feedback signal S2 with the dead point default value by means of performing an arithmetic operation, so as to control the logic array unit 404 to output the control signal S3, and also converts the moving command S1 into the moving signal S4 for outputting. Meanwhile, through the arithmetic operation executed by the microprocessor 402, the arbitration module 40 can adjust the default value of dead point. In addition, the arbitration module 40 may also be connected to the second driving module 44, and by means of the connection there between, it may control the second driving module 44 to adjust the output of the second driving signal S6.

In conjunction with FIG. 3 again, refer now to FIG. 4, wherein the first driving module 42 comprises an error amplifier 420, a PID (Proportional-Integral-Derivative) processor 422 and an adder 424. The error amplifier 420 performs the subtraction of the moving signal S4 and the moving feedback signal S2 to output a position error signal Verror. The PID processor 422 comprises a proportional processor 4220, an integration processor 4222 and a differentiation processor 4224, in which the above-said processors 4220, 4222, 4224 are all connected to the error amplifier 420, and performs respectively ratio operation, integration operation and differentiation operation on the position error signal Verror, so as to further output a proportional signal S7, an integration signal S8 and a differentiation signal S9. The adder 424 is connected to these processors 4220, 4222, 4224 to perform addition operation for integrating the said proportional signal S7, integration signal S8 and differentiation signal S9, so as to ultimately output a driving signal S5.

In conjunction with FIG. 3 once again, referring to FIG. 4, the error correction module 48 comprises a differentiation processor discharging switch 482 and an integration processor discharging switch 484, wherein the differentiation processor discharging switch 482 is connected to the differentiation processor 4224 in the PID processor 422, and the integration processor discharging switch 484 is connected to the integration processor 4222 in the PID processor 422. the differentiation processor discharging switch 482 and the integration processor discharging switch 484 are both controlled by the arbitration module 40 for respectively correct the accumulated position error signal Verror (accumulated error) that individually exists in the differentiation processor 4224 and the integration processor 4222.

Yet in conjunction with FIG. 3 once again, referring to FIG. 4, the second driving module 44 is a current driving module or a voltage driving module. In FIG. 4, the second driving module 44 is depicted as a voltage driving module as an example, wherein the second driving module 44 is composed of a bias voltage Vdd and a variable resistor R, which may generate different second driving signal S6 outputs by adjusting the variable resistor R. Furthermore, the switching module 46 comprises a switch 460 and an amplifier 462, in which the switch 460 is controlled by the control signal S3 outputted by the arbitration module 40 for performing switch action, allowing the first driving signal S5 or the second driving signal S6 to be sent to the amplifier 462. The amplifier 462 can amplify the first driving signal S5 or the second driving signal S6 and send it to the controlled device 5.

Figure 5:
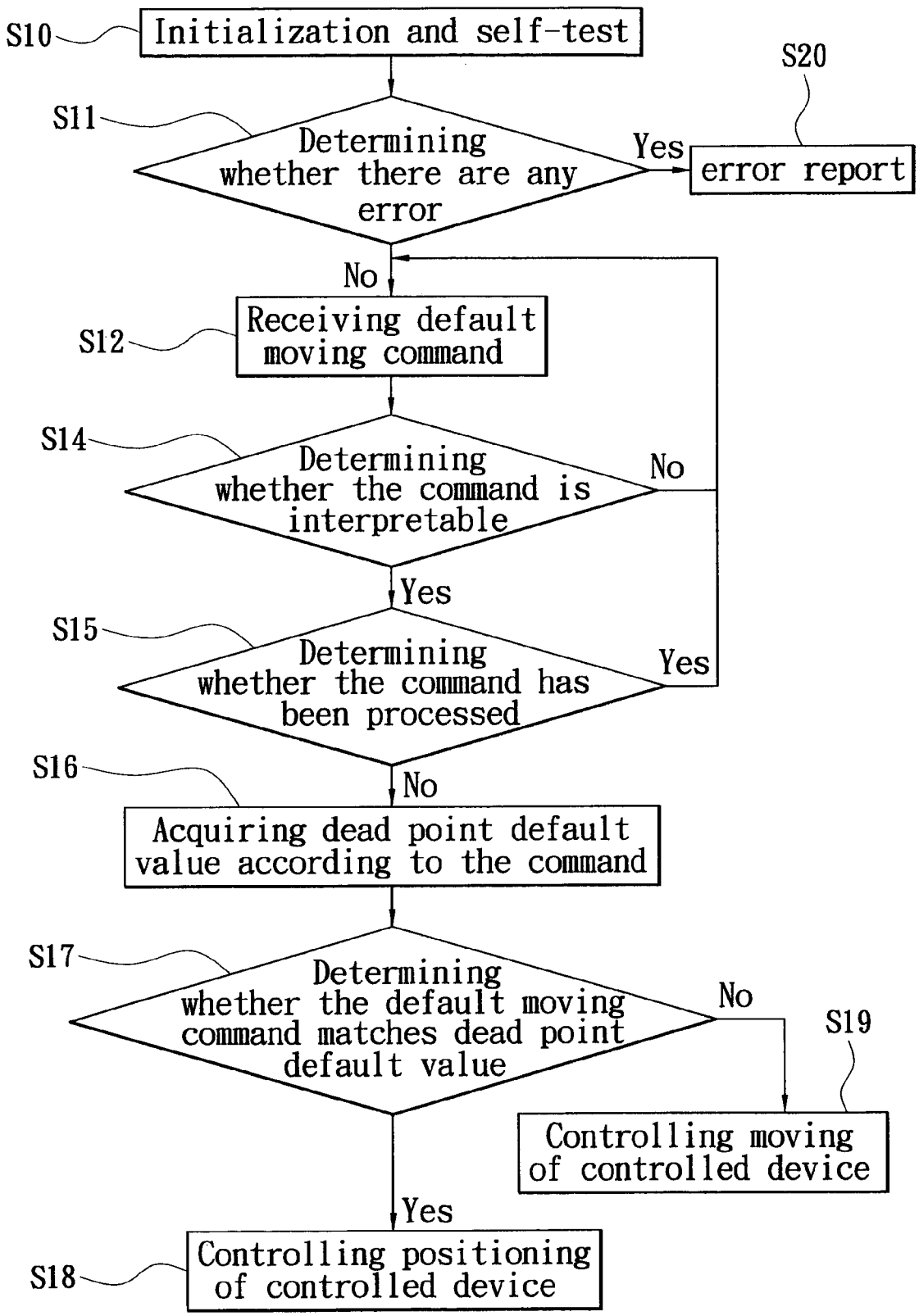
FIG. 5 shows a flowchart of the method for positioning control according to the present invention.

In conjunction with FIG. 3, refer now to FIG. 5, wherein a flowchart of the method for positioning control according to the present invention is shown. The method for positioning control according to the present invention is applicable to the said positioning control apparatus 4, allowing it to control the moving and positioning of the controlled device 5. First, the positioning control apparatus 4 receives the moving command S1 from a man-machine interaction or commander (MMI-C not shown) (S12), and determines whether the moving command S1 can be interpreted (S14). If it is interpretable, then next, it determines whether the moving command S1 has been processed in a previous operation (S15). If the moving command S1 has not been processed in a previous operation, then the positioning control apparatus 4 internally acquires a dead point default value corresponding to the moving command S1 in accordance with the moving command S1 (S16); meanwhile, the positioning control apparatus 4 controls the controlled device 5 to enter into moving operation based on the moving command S1.

While the controlled device 5 is moving under control, the positioning control apparatus 4 determines whether the moving command S1 and the moving feedback signal S2 match the dead point default value (S17); if yes, then the positioning control apparatus 4 controls the controlled device 5 to enter into positioning operation (S18). In this positioning operation, the positioning control apparatus 4 clears altogether the accumulated error stored therein, such that the next positioning operation will not be thereby influenced. Alternatively, in case the moving command S1 and the moving feedback signal S2 do not match the dead point default value, then the positioning control apparatus 4 controls the controlled device 5 to enter into moving operation according to the moving command S1 (S19). In the moving operation, the positioning control apparatus 4 periodically clears the accumulated error stored therein, such that the moving operation will not be thereby influenced.

In conjunction again with FIG. 3, refer to FIG. 5, wherein, before the positioning control apparatus 4 receives the moving command S1, it first performs initialization and self-test procedure in advance (S10), then determines whether the performance of such a procedure is normal (S11); if any error occurs in the positioning control apparatus 4, then the positioning control apparatus 4 generates an error report message (S20) to inform the user; in case no error occurs, the workflow moves to step S12. Otherwise, if the moving command S1 can not be interpreted (S14), then the positioning control apparatus 4 returns to the step of receiving the moving command S1 (S12) and tries to receive the moving command S1 once more, so as to acquire interpretable moving command S1. Additionally, if the received moving command S1 has been processed during the previous operation (S15), then the positioning control apparatus 4 will return to the step of receiving the moving command S1 (S12) and try to receive the moving command S1, in order to acquire unprocessed moving command S1.

Figure 6:
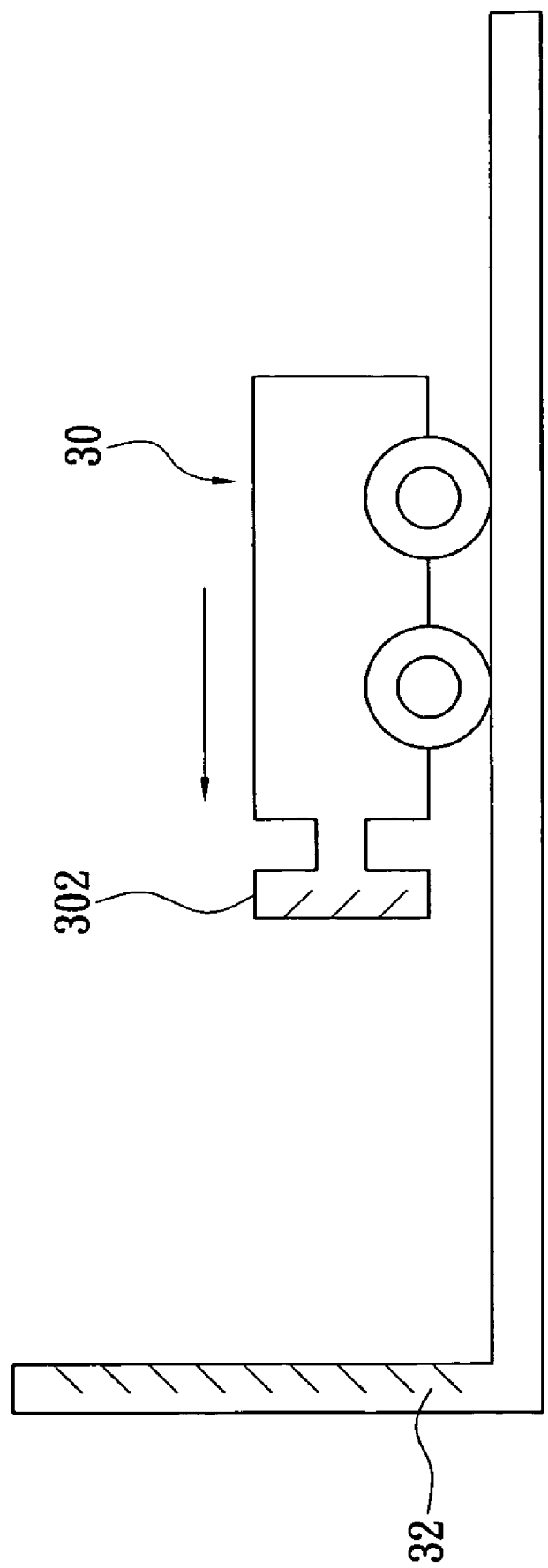
FIG. 6 shows a diagram of an embodiment for the slider moving control according to the present invention.

In conjunction with FIG. 3, refer now to FIG. 6, wherein a diagram of an embodiment for the slider moving control according to the present invention is shown. Herein, the positioning control apparatus 4 according to the present invention controls the actions of the controlled device 5 installed within a slider 30, so as to drive the slider 30 to move in a direction. In this embodiment, the positioning control apparatus 4 according to the present invention performs moving operation, in order to control the slider 30 to move toward the critical plane 32. When the leading plane 302 of the slider 30 approaches the critical plane 32, the positioning control apparatus 4 performs positioning operation, enabling the spacing gap between the leading plane 302 and the critical plane to decrease to approximately zero.

Figure 1:
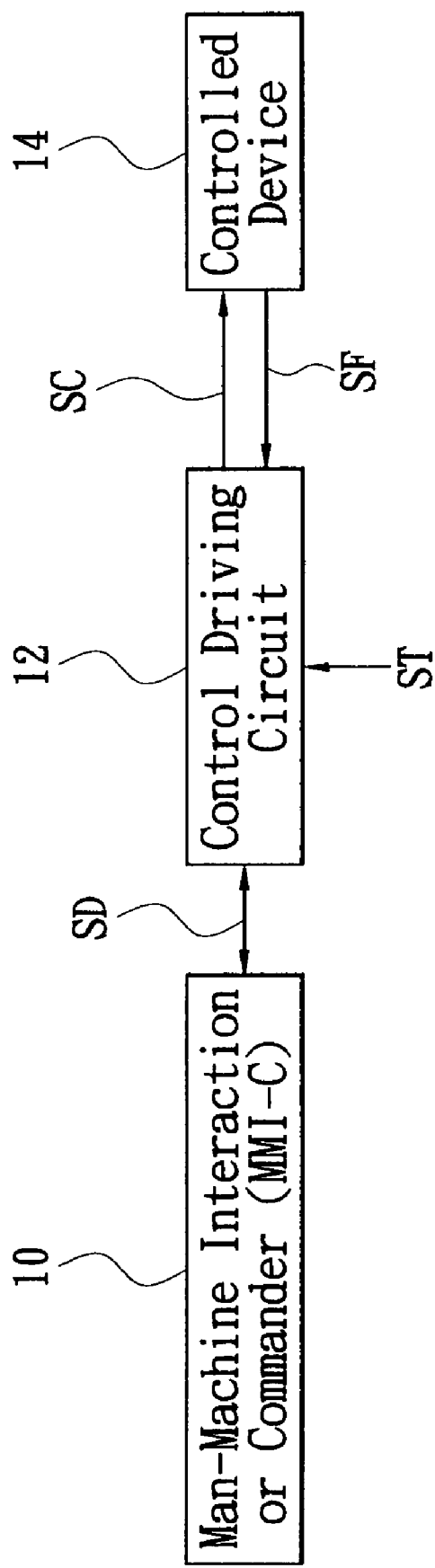
FIG. 1 shows a block diagram of a prior art control system.
Figure 2:
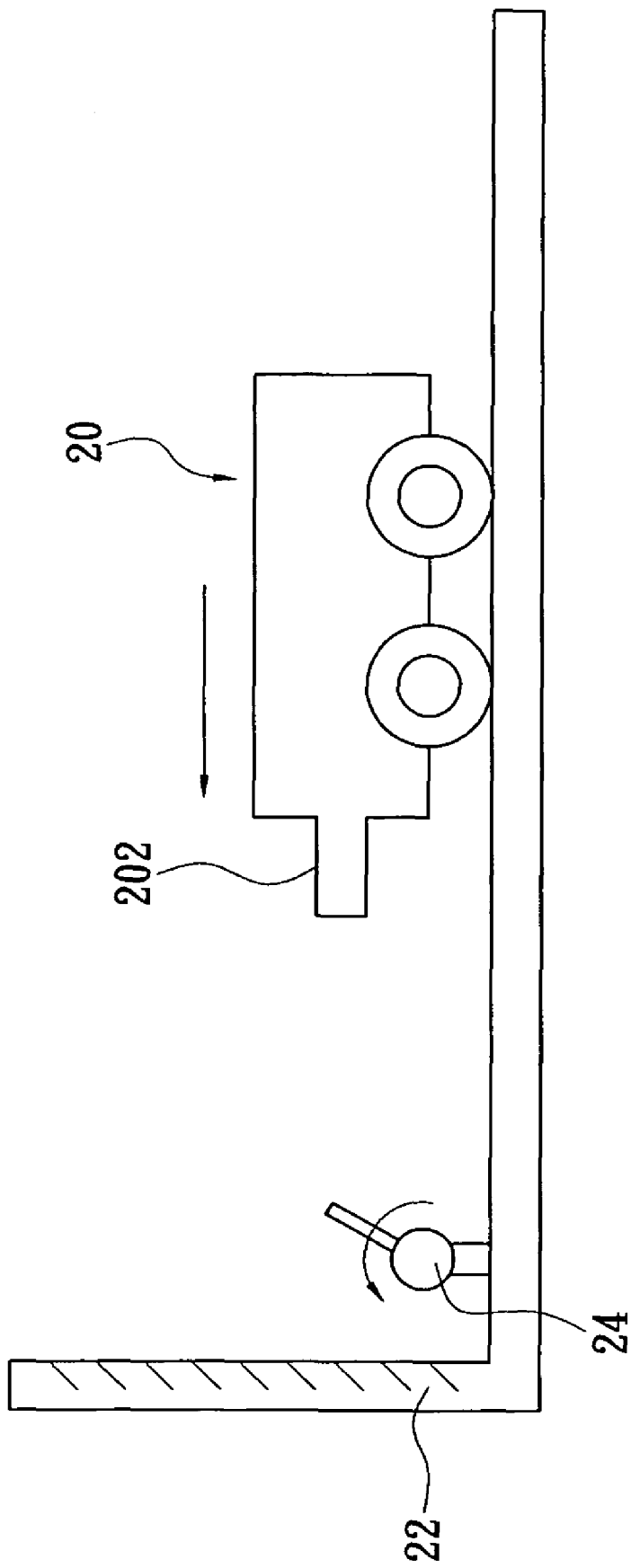
FIG. 2 shows a diagram of prior art slider moving control.

In summary, the apparatus for positioning control according to the present invention needs not employ a feedback device (i.e. FIG. 2 feed back device 24), while still allowing the controlled device to be precisely positioned, so as to prevent the controlled device from entering into dead point area and causing serious damage, thus suitable for the applications in the micro cosmic or near-field realms, providing advantage of miniaturization applicability. At the same time, the apparatus for positioning control according to the present invention offers positioning control of high precision and low error through the performance of positioning operations, without influences from the factors like wearing, dusts, airflow, vibrations and so on.

The aforementioned descriptions illustrate merely the preferred embodiments of the present invention; whereas the aspects of the present invention are by no means limited thereto. All changes and modifications that any skilled ones in the relevant art may conveniently consider are deemed to be encompassed by the claims of the present invention set out hereunder.

What is claimed is:

1. An apparatus for positioning control, which receives a moving command and a moving feedback signal outputted by a controlled device, in order to control the moving and positioning of the controlled device, the said apparatus comprising:
an arbitration module, which has a dead point default value, and the arbitration module compares the moving command and a moving feedback signal with the dead point default value to output a control signal, and converts the moving command into a moving signal;
a first driving module, which is connected to the arbitration module and the controlled device, in which the first driving module receives the said moving signal and a moving feedback signal to output a first driving signal for controlling the moving of the controlled device;
a second driving module, which outputs a second driving signal for controlling the positioning of the controlled device; and
a switching module, which is connected to the arbitration module, the first driving module, the second driving module and the controlled device, in which the switching module is controlled by the control signal so as to send either the first driving signal or the second driving signal to the controlled device.

2. The apparatus for positioning control according to claim 1, further comprises an error correction module, in which the error correction module is connected to the arbitration module and first driving module, and controlled by the arbitration module to correct the accumulated error existing in the first driving module.

3. The apparatus for positioning control according to claim 2, wherein the first driving module comprises:
an error amplifier, which performs the subtraction of the moving signal and the moving feedback signal to output a position error signal;
a PID (Proportional-Integral-Derivative) processor, which is connected to the error amplifier, wherein the PID processor performs process on the position error signal and outputs a proportional signal, an integration signal and a differentiation signal; and
an adder, which is connected to the PID processor to integrate the said proportional signal, integration signal and differentiation signal and to output the first driving signal.

4. The apparatus for positioning control according to claim 1, wherein, if the moving command and the moving feedback signal do not match the dead point default value, then the control signal controls the switching module to switch the first driving signal to be outputted to the controlled device, so as to control the moving of the controlled device; if the moving command and the moving feedback signal match the dead point default value, then the control signal controls the switching module to switch the second driving signal to be outputted to the controlled device, so as to control the positioning of the controlled device.

5. The apparatus for positioning control according to claim 1, wherein the arbitration module comprises a microprocessor and a logic array unit, in which the microprocessor performs an arithmetic operation to compare the moving command and the moving feedback signal with the dead point default value, in order to control the logic array unit to output the control signal and convert the moving command into the moving signal.

6. The apparatus for positioning control according to claim 5, wherein the arbitration module is connected to the second driving module, in which the arbitration module is used to control the second driving module to adjust the second driving signal output by means of the arithmetic operation performed by the microprocessor.

7. The apparatus for positioning control according to claim 5, wherein the arbitration module is used to adjust the dead point default value by means of the arithmetic operation performed by the microprocessor.

8. The apparatus for positioning control according to claim 3, wherein the PID processor is further connected to the error correction module, and the error correction module comprises a differentiation processor discharging switch and an integration processor discharging switch, and the two switches are controlled by the arbitration module, so as to correct the accumulated error stored in the PID processor.

9. An apparatus for positioning control, which receives a moving command and a moving feedback signal, outputted by a controlled device, in order to control the moving and positioning of the controlled device, the said apparatus comprising:
a first control loop for outputting a first driving signal, which is used to control the moving of the controlled device according to the moving command and the moving feedback signal;
a second control loop for outputting a second driving signal, which is used to control the positioning of the controlled device; and
an arbitration module, which has a dead point default value, wherein the arbitration module compares the moving command and the moving feedback signal with the dead point default value, and determines either the first control loop or the second control loop to control the controlled device based on the comparison.

10. The apparatus for positioning control according to claim 9, wherein the arbitration module comprises a microprocessor and a logic array unit, in which the microprocessor performs an arithmetic operation to compare the moving command and the moving feedback signal with the dead point default value, in order to control the logic array unit to output a control signal and convert the moving command into the moving signal.

11. The apparatus for positioning control according to claim 10, wherein the first control loop comprises:
a first driving module, which is connected to the arbitration module and the controlled device, in which the first driving module receives the said moving signal and the moving feedback signal to output the first driving signal; and
a switching module, which is connected to the arbitration module, the first driving module, the second driving module and the controlled device, in which the switching module is controlled by the control signal so as to send the first driving signal to the controlled device.

12. The apparatus for positioning control according to claim 11, wherein the second control loop comprises:
a second driving module, which outputs the second driving signal; and
the switching module, which is connected to the arbitration module, the second driving module and the controlled device, wherein the switching module is controlled by the control signal and switches to output the second driving signal to the controlled device.

13. The apparatus for positioning control according to claim 11, further comprises an error correction module, in which the error correction module is connected to the arbitration module and the first driving module, and the error correction module is controlled by the arbitration module to correct the accumulated error stored in the first driving module.

14. The apparatus for positioning control according to claim 13, wherein the first driving module comprises:
   an error amplifier, which performs the subtraction of the moving signal and the moving feedback signal to output a position error signal;
   a PID processor, which is connected to the error amplifier, wherein the PID processor performs process on the position error signal and outputs a proportional signal, an integration signal and a differentiation signal; and
   an adder, which is connected to the PID processor to integrate the said proportional signal, integration signal and differentiation signal and to output the first driving signal.

15. The apparatus for positioning control according to claim 12, wherein the second driving module is further connected to the arbitration module, which is controlled by the arbitration module to adjust the output of the second driving signal.

16. The apparatus for positioning control according to claim 10, wherein the arbitration module is used to adjust the dead point default value through the operation performed by the microprocessor.

17. The apparatus for positioning control according to claim 14, wherein the PID processor is further connected to the error correction module, and the error correction module comprises a differentiation processor discharging switch and an integration processor discharging switch, and the two switches are controlled by the arbitration module, so as to correct the accumulated error stored in the PID processor.

18. A method for positioning control, which is applicable to an apparatus for positioning control for controlling the moving and positioning of a controlled device, wherein the method comprises the following steps:
   providing a first driving signal for controlling the moving of the controlled device through a first driving module;
   providing a second driving signal for controlling the positioning of the controlled device through a second driving module;
   receiving a moving command, and determining whether the moving command can be interpreted;
      if it is interpretable, then determining whether the moving command has been processed;
      if not yet being processed, then acquiring a dead point default value based on the moving command;
      determining whether the moving command and a moving feedback signal and the dead point default value match; and
      if they match, then using the second driving signal to control the controlled device to be positioned, if they do not, then using the first driving signal to control the controlled device to be moved.

19. The method for positioning control according to claim 18, wherein, before the step of receiving the moving command, the apparatus for positioning control performs a step of initialization and self-test, and during the step of initialization and self-test, it generates an error report message in case any error occurs.

20. The method for positioning control according to claim 18, wherein, in the step of determining whether the moving command is interpretable, if it is not interpretable, then restarting to receiving the moving command.

21. The method for positioning control according to claim 18, wherein, in the step of determining whether the moving command has been processed, if it has been processed, then returning to the step of receiving the moving command.

22. The method for positioning control according to claim 18, wherein, in the step of controlling the positioning of the controlled device, further comprises a step of periodically clearing the accumulated error stored in the positioning control apparatus.

* * * * *